US008412355B2

(12) United States Patent
Hur

(10) Patent No.: US 8,412,355 B2
(45) Date of Patent: Apr. 2, 2013

(54) SYSTEM FOR TRANSFERRING CONTROLLING AUTHORITY OF A DEVICE

(75) Inventor: Se-huhn Hur, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 12/752,351

(22) Filed: Apr. 1, 2010

(65) Prior Publication Data

US 2011/0054641 A1 Mar. 3, 2011

(30) Foreign Application Priority Data

Sep. 2, 2009 (KR) ........................ 10-2009-0082429

(51) Int. Cl.
*G05B 11/01* (2006.01)

(52) U.S. Cl. ............................................. 700/20; 726/4

(58) Field of Classification Search .................... 700/19, 700/20

See application file for complete search history.

(56) References Cited

U.S. PATENT DOCUMENTS

| | | | |
|---|---|---|---|
| 6,133,941 | A | 10/2000 | Ono |
| 2003/0177489 | A1 | 9/2003 | Watanabe et al. |
| 2006/0105749 | A1 * | 5/2006 | Han et al. .................. 455/412.1 |
| 2006/0185000 | A1 | 8/2006 | Im et al. |
| 2007/0204148 | A1 * | 8/2007 | Sakamura et al. ............ 713/156 |
| 2008/0229406 | A1 | 9/2008 | Go |

FOREIGN PATENT DOCUMENTS

| | | | |
|---|---|---|---|
| JP | 2006262184 | A * | 9/2006 |
| JP | 2007-184745 | A | 7/2007 |
| KR | 10-2007-0042771 | A | 4/2007 |

OTHER PUBLICATIONS

Machine Translation of JP 2006-262184 A.*
European Search Report issued on Jul. 6, 2011 by the European Patent Office in Application No. 10157843.3.

* cited by examiner

*Primary Examiner* — Ryan Jarrett
(74) *Attorney, Agent, or Firm* — Sughrue Mion, PLLC

(57) ABSTRACT

Systems and method for controlling a device are provided, including at least one controlling device and at least one controlled device. The controlling system includes a first controlling device which has controlling authority over the controlled device and a second controlling device which requests and receives the controlling authority over the controlled device from the first controlling device. Therefore, a controlling device may more easily and intuitively receive controlling authority from other devices.

9 Claims, 8 Drawing Sheets

SYSTEM FOR TRANSFERRING CONTROLLING AUTHORITY OF A DEVICE

CROSS-REFERENCE TO RELATED APPLICATIONS

This application claims priority from Korean Patent Application No. 10-2009-0082429, filed on Sep. 2, 2009, in the Korean Intellectual Property Office, the disclosure of which is incorporated herein by reference in its entirety.

BACKGROUND

1. Field

Apparatuses and methods consistent with exemplary embodiments relate to a controlling device, a controlled device, a controlling system, and a method for providing controlling authority, and more particularly, to a controlling device which determines a target to control or to be controlled based on controlling authority, a controlled device, a controlling system, and a method for providing controlling authority.

2. Description of the Related Art

Generally, controlling systems control a controlled device remotely or locally using a controlling device in a wired or wireless manner. With the development of controlling systems, a user can control a controlled device more conveniently without spatial limitations.

As a plurality of controlling devices may be used to control a single controlled device in controlling systems for homes and offices, controlling signals being output from the controlling devices may frequently interfere with each other. To prevent such interference between the controlling signals, authority for controlling a controlled device has been provided only to a specific controlling device.

However, if only a specific controlling device is authorized to control a controlled device, it is impossible to control the controlled device using other controlling devices. Accordingly, this singly-authorized controlling device is inappropriate when the other controlling devices are required to control the controlled device.

Therefore, there is a need for systems, methods and devices to retrieve authority provided to a specific controlling device.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provides a controlling device which efficiently transmits and receives controlling authority to and from a plurality of controlling devices, a controlled device, a controlling system, and a method for providing controlling authority.

According to an exemplary aspect, there is provided a controlling system, including a controlled device; a first controlling device which has controlling authority for the controlled device; and a second controlling device which requests the controlled device or the first controlling device to provide the controlling authority for the controlled device to the second controlling device, and receives the controlling authority for the controlled device from the controlled device or the first controlling device based on the request for providing the controlling authority.

In another exemplary embodiment, the controlled device or the first controlling device which is requested to provide the controlling authority may determine whether or not to provide the controlling authority to the second controlling device, and provide the controlling authority to the second controlling device according to the determination.

In a further exemplary embodiment, if the first controlling device does not respond to the request for retrieving the controlling authority for a predetermined time, the controlled device may provide the controlling authority to the second controlling device.

In still another exemplary embodiment, if the second controlling device requests the controlled device or the first controlling device to provide the controlling authority, the controlled device or the first controlling device may transmit a message indicating that the controlling authority is requested to at least one of the controlled device, the first controlling device, and the second controlling device.

In a yet further exemplary embodiment, if the controlling authority is provided to the second controlling device, the controlled device or the first controlling device may transmit a message indicating that the controlling authority is provided to the second controlling device to at least one of the controlled device, the first controlling device, and the second controlling device.

In another exemplary embodiment, if it is not approved for the controlling authority to be provided to the second controlling device, the controlled device or the first controlling device may transmit a message indicating disapproval of the retrieval of the controlling authority to at least one of the controlled device, the first controlling device, and the second controlling device.

In still another exemplary embodiment, the controlled device may store information regarding a state of ownership of the controlling authority for the controlled device.

In a further exemplary embodiment, if the second controlling device possesses information that an owner of the controlling authority for the controlled device is the first controlling device, the second controlling device may request the first controlling device to provide the controlling authority to the second controlling device, and if the second controlling device does not possess the information that an owner of the controlling authority for the controlled device is the first controlling device, the second controlling device may request the controlled device to provide the controlling authority to the second controlling device.

In a yet further exemplary embodiment, the first controlling device or the second controlling device may display a list on a screen of devices which are capable of being controlled by the first controlling device or the second controlling device, select the controlled device from the list, and request the selected controlled device to provide the controlling authority.

In still another exemplary embodiment, if the controlling authority is provided to the second controlling device, the first controlling device is deprived of the controlling authority.

According to another exemplary embodiment, there is provided a controlled device which is controlled by at least one of controlling devices, the controlled device including a transceiver which is requested to provide controlling authority for the controlled device; a storage unit which stores information regarding a state of ownership of the controlling authority; and a controlling unit which searches for a first controlling device to which the controlling authority is provided based on the information regarding a state of ownership of the controlling authority, receives the controlling authority from the first controlling device having the controlling authority, and causes the controlling authority to be transmitted to a second controlling device which has requested the controlling authority.

According to another exemplary embodiment, there is provided a controlling device which controls at least one of controlled devices, the controlling device including a transceiver which is requested to provide the controlling authority for the controlled device; and a controlling unit which determines whether or not to provide the requested controlling authority, and causes a message allowing the retrieval of the controlling authority or a message indicating disapproval of the retrieval of the controlling authority to be transmitted to the controlled device based on the determination.

According to another exemplary embodiment, there is provided a method for providing controlling authority, including receiving a request for providing controlling authority for a controlled device; searching for a device to which the controlling authority is provided based on information regarding a state of ownership of the controlling authority for the controlled device; receiving the controlling authority from the device having the controlling authority; and providing the controlling authority to a device which has requested the controlling authority.

BRIEF DESCRIPTION OF THE DRAWINGS

The above and/or other aspects will be more apparent from the following description of exemplary embodiments taken in conjunction with the accompanying drawings, in which.

DETAILED DESCRIPTION OF EXEMPLARY EMBODIMENTS

Figure 1:
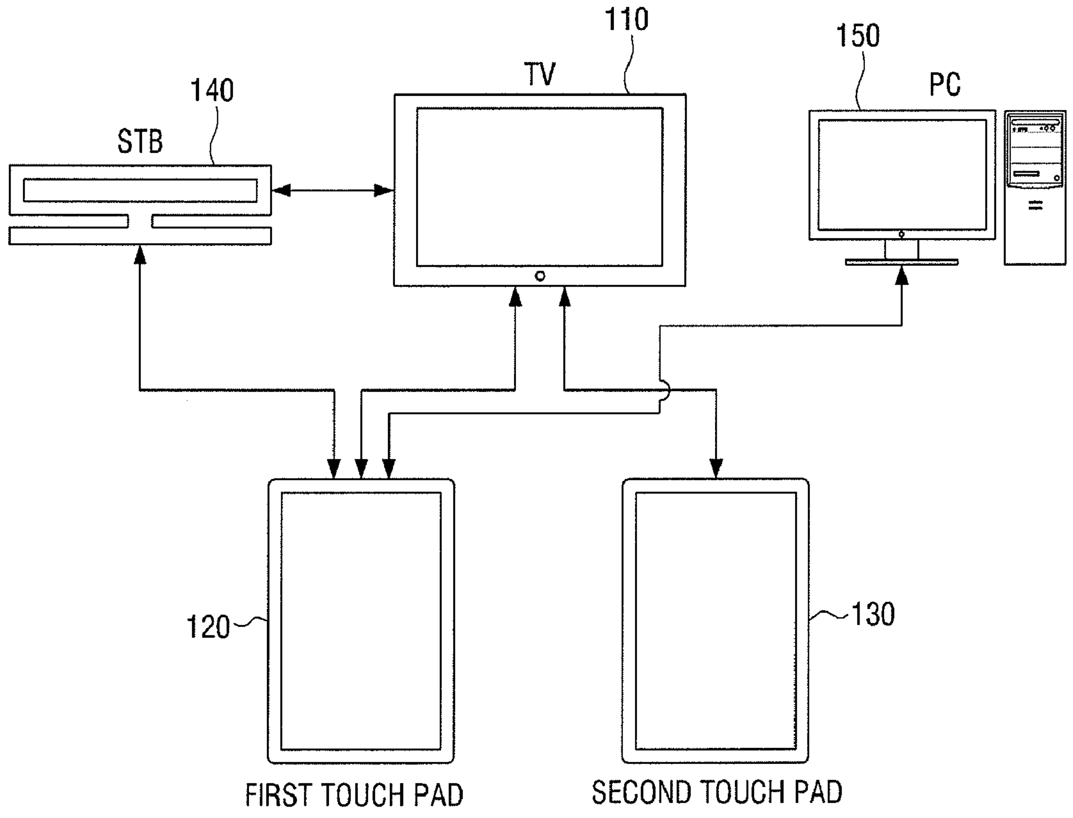
FIG. 1 is a block diagram illustrating a controlling system, according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a controlling system according to an exemplary embodiment. The controlling system according to the exemplary embodiment comprises a plurality of controlling devices and a plurality of controlled devices. Each controlling device may control a plurality of controlled devices, and each controlled device may be controlled by the plurality of controlling devices.

The controlled devices may comprise a television (TV) 110, a set-top box (STB) 140, and a personal computer (PC) 150, while the controlling devices may comprise a first touch pad 120 and a second touch pad 130.

In this exemplary embodiment, the first touch pad 120 is used to control the TV 110, the STB 140, and the PC 150, and the second touch pad 130 is used to control the TV 110, as indicated by the arrows connecting the controlled devices and controlling devices.

Since the TV 110 may be controlled by both the first touch pad 120 and the second touch pad 130, the TV 110 may operate according to a controlling command which is received from the device having controlling authority; in this example, either the first touch pad 120 or the second touch pad 130 may have controlling authority.

The controlling authority is required for a controlling device to control a controlled device. All of a plurality of controlling devices may have the controlling authority, or only one of the plurality of controlling devices may have the controlling authority. In addition, the controlling authority may be possessed by a single controlling device all the time, or may be possessed by one of the plurality of controlling devices temporarily.

In this exemplary embodiment, the controlling authority to control the TV 110 may be provided to either the first touch pad 120 or the second touch pad 130, and the controlling authority may be transferred from the first touch pad 120 to the second touch pad 130, or vice versa.

A method will now be described with reference to FIG. 2, where the first touch pad 120 requests the second touch pad 130 to transfer controlling authority when the second touch pad 130 has the controlling authority.

Figure 2:
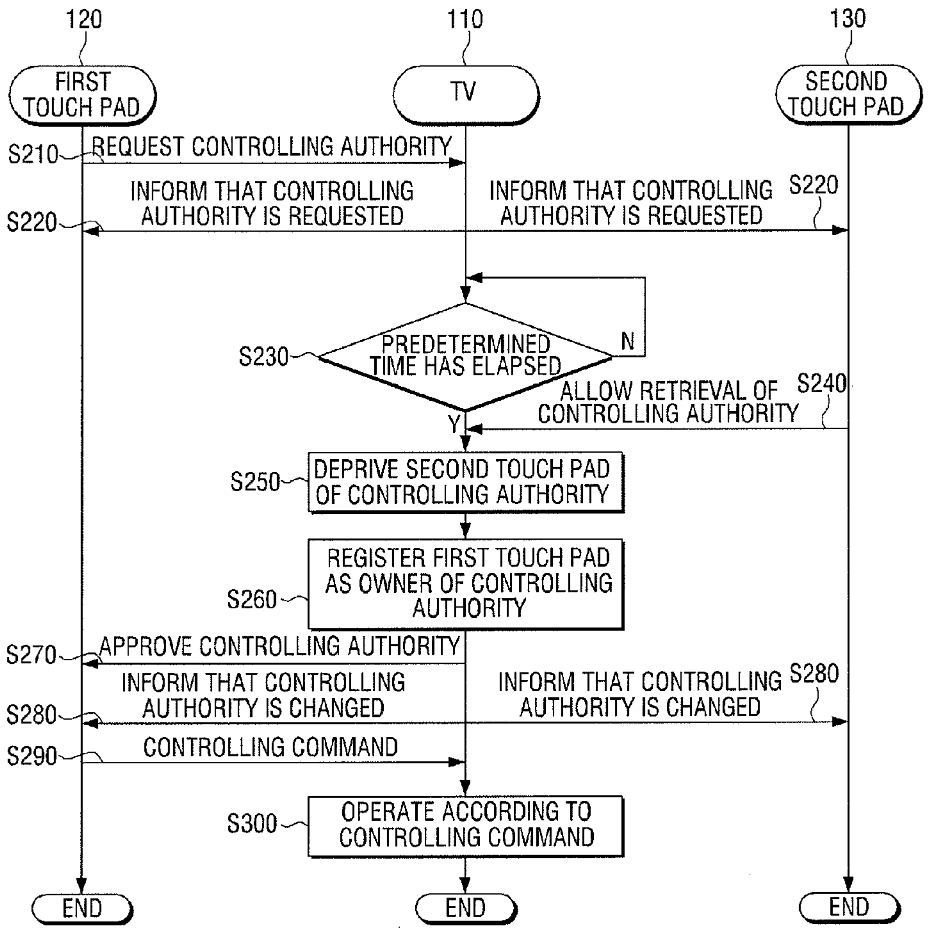
FIG. 2 is a flowchart illustrating a method for providing controlling authority, according to an exemplary embodiment.

FIG. 2 is a flowchart illustrating a method for providing controlling authority, according to an exemplary embodiment.

If the first touch pad 120 requests that the TV 110 provide controlling authority for the TV 110 to the first touch pad (S210), the TV 110 may inform the first touch pad 120 and second touch pad 130 that the controlling authority has been requested (S220). The request for providing the controlling authority may be provided to the first touch pad 120 and second touch pad 130 in a broadcasting manner, and may be provided to devices other than the first touch pad 120 and second touch pad 130.

The exemplary embodiment illustrated in FIG. 2 may provide two methods for the first touch pad 120 to retrieve the controlling authority for the TV 110.

In a first method, a message allowing the retrieval of the controlling authority may be transmitted from the second touch pad to the TV 110 (S240). This first method may be used when the second touch pad 130 is turned on, or when the second touch pad 130 is capable of actively responding to the request for retrieving the controlling authority.

In a second method, the TV 110 does not receive any message from the second touch pad 130 after a predetermined time has elapsed (S230-Y), even though the second touch pad has been informed of the request for retrieving the controlling authority in operation S220. This second method may be used when the second touch pad 130 is turned off, or when the second touch pad 130 is not capable of actively responding to the request for retrieving the controlling authority. Alternatively, the second touch pad 130 may not be capable of responding if the second touch pad 130 does not have the exclusive controlling authority. This feature is designed to prevent the user from retrieving the controlling authority at the same time the user is depriving the exclusive controlling authority that was intentionally set by a user.

As described above, if the TV 110 receives the message from the second touch pad 130 allowing the retrieval of the controlling authority from the second touch pad 130 (S240), or a predetermined time has elapsed while the TV 110 does not receive any response from the second touch pad 130 (S230-Y), the TV 110 may deprive the second touch pad 130 of the controlling authority (S250) and register the first touch pad 120 as the owner of the controlling authority (S260).

The TV 110 approves the request for retrieving the controlling authority received from the first touch pad 120 (S270), and broadcasts a message indicating that a controlling device having the controlling authority is changed in order to inform the first touch pad 120, the second touch pad 130, and additional controlling devices of the change (S280).

Once the controlling authority has been transferred, if a controlling command is input from the first touch pad 120 (S290), the TV 110 operates according to the controlling command input from the first touch pad 120 (S300). Of course, the TV 110 no longer operates by any command which is input from the second touch pad 130.

By performing the method described above, the first touch pad 120 may retrieve the controlling authority which the second touch pad 130 possesses more easily and intuitively.

The method for retrieving controlling authority according to the request for retrieving the controlling authority described above may also be applied when the controlling authority is not retrieved as explained below with reference to FIG. 3.

Figure 3:
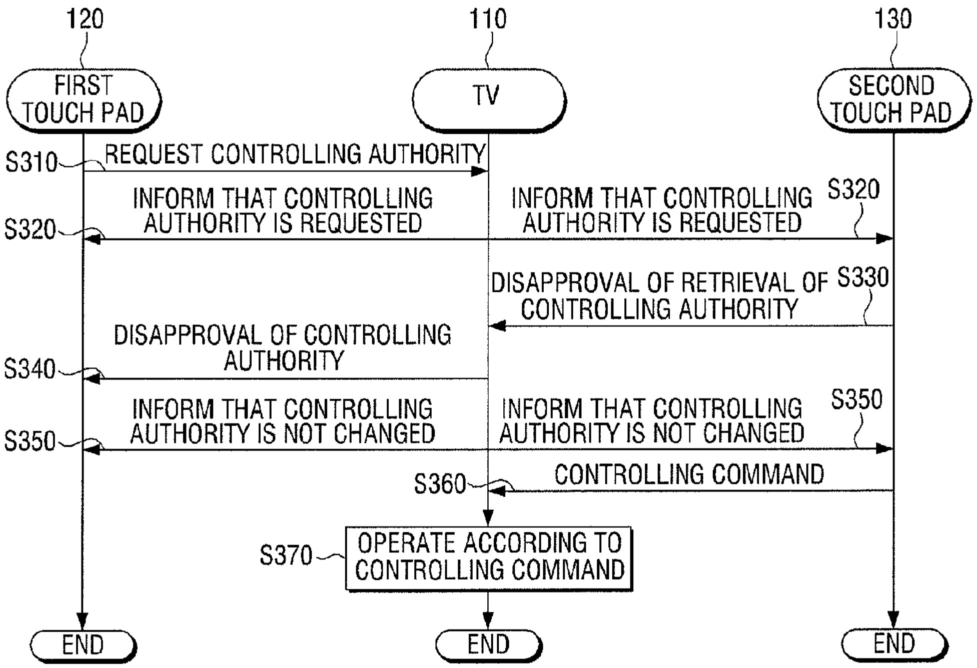
FIG. 3 is a flowchart illustrating a method of not providing controlling authority, according to an exemplary embodiment.

FIG. 3 is a flowchart illustrating a method when controlling authority is not provided to a requesting controlling device.

If the first touch pad 120 requests the TV 110 to provide controlling authority for the TV (S310), the TV 110 may inform the first touch pad 120 and second touch pad 130 that the controlling authority has been requested (S320). The request for retrieving the controlling authority may be broadcast to the first touch pad 120 and second touch pad 130, and may also be broadcast to devices other than the first touch pad 120 and second touch pad 130.

The second touch pad 130, which has now been informed of the request from the first touch pad 120 to retrieve the controlling authority, may recognize that the second touch pad 130, itself, is authorized for the controlling authority that the first touch pad 120 requested. If the second touch pad 130 desires to maintain the controlling authority without transferring the controlling authority to the first touch pad 120, the second touch pad 130 may transmit a message to the TV 110 indicating disapproval of the retrieval of the controlling authority (S330), and the TV 110 may transmit a message to the first touch pad 120 indicating disapproval of the request for retrieving the controlling authority (S340), based on the message indicating disapproval of the retrieval of the controlling authority.

The TV 110 informs the first touch pad 120 and second touch pad 130 that the ownership of the controlling authority is not changed (S350). The information that the ownership of the controlling authority is not changed may be broadcast to the first touch pad 120 and second touch pad 130, and may be broadcast to devices other than the first touch pad 120 and second touch pad 130.

If a controlling command is input from the second touch pad 130 (S360), the TV 110 continues to operate according to the controlling command input from the second touch pad 130 (S370), as it did before the request for controlling authority from the first touch pad 120 (S310). Of course, the TV 110 does not operate by any command which is input from the first touch pad 120.

Figure 4:
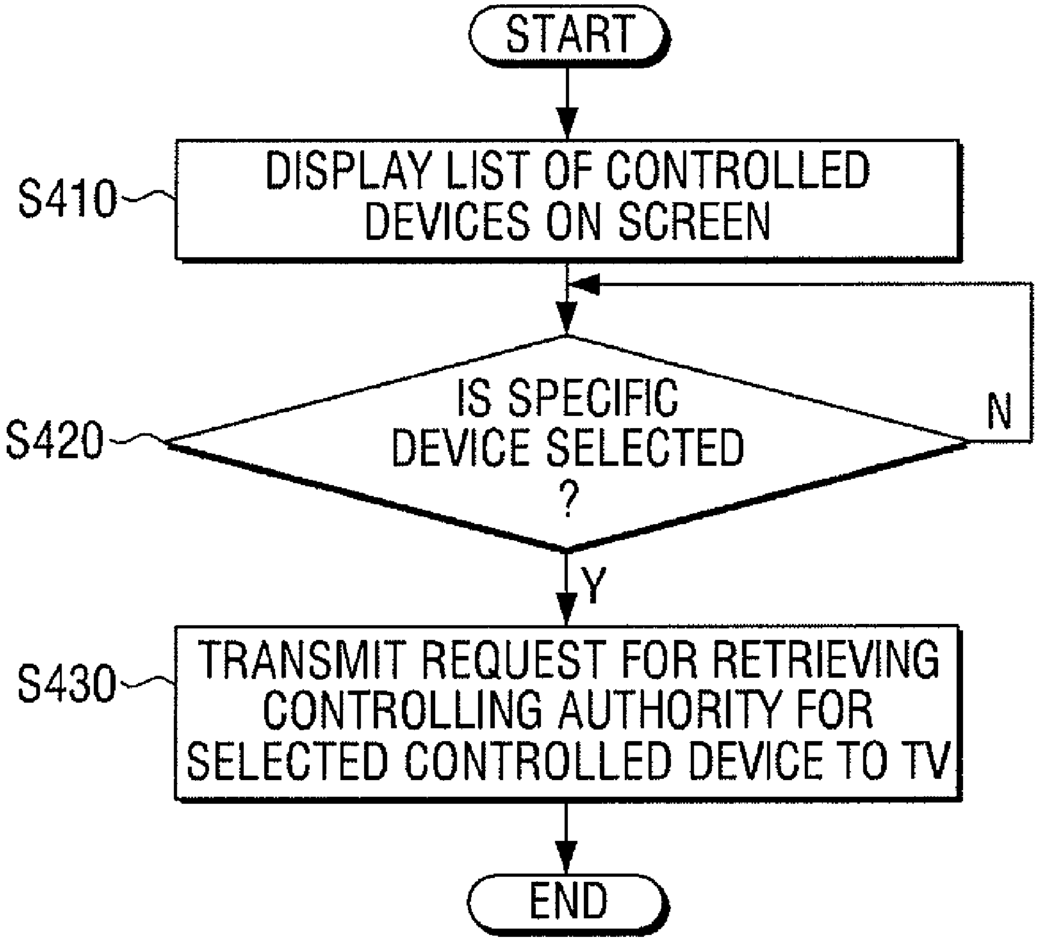
FIG. 4 is a flowchart illustrating a method for requesting controlling authority from a first touch pad.

FIG. 4 is a flowchart illustrating a exemplary method of requesting controlling authority, as carried out by the first touch pad 120.

If the first touch pad 120 is capable of controlling a controlled device, a list of controlled devices that the first touch pad 120 may be able to control is displayed on a screen of the first touch pad 120 (S410).

If a user selects a specific controlled device from the list of controlled devices displayed on the screen (S420-Y), the first touch pad 120 transmits a request for retrieving controlling authority for the selected controlled device to the TV 110 (S430).

With the method described above with regard to FIG. 4, the first touch pad 120 may retrieve the controlling authority more easily and intuitively.

Figure 5:
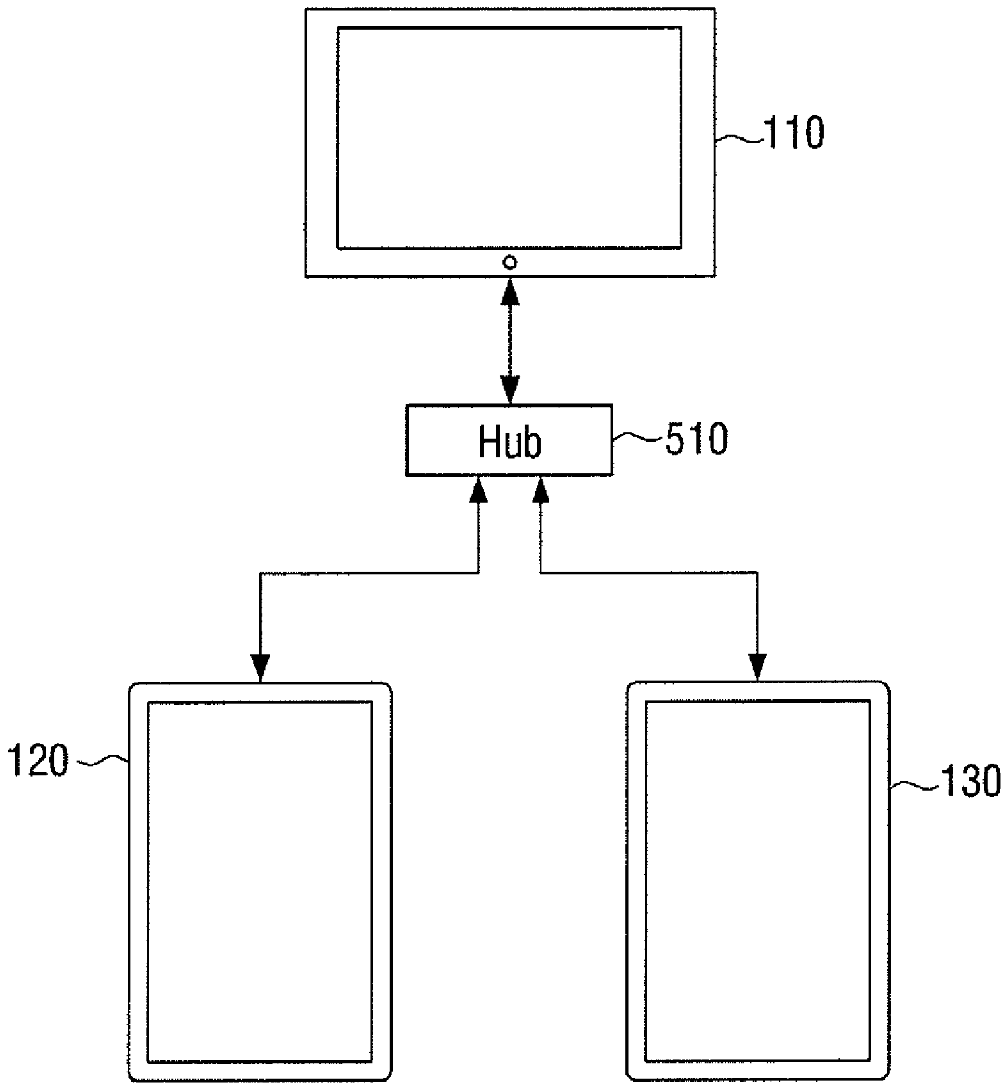
FIG. 5 is a block diagram illustrating a controlling system, according to another exemplary embodiment.

In one exemplary embodiment, the controlling authority may be directly transferred between the TV 110 and the first touch pad 120 and second touch pad 130 through wired communication, as illustrated in the block diagram of a controlling system in FIG. 5. The first touch pad 120 requests the TV 110 to provide controlling authority via a hub 510, and the TV 110 retrieves the controlling authority from the second touch pad 130 via the hub 510.

Figure 6:
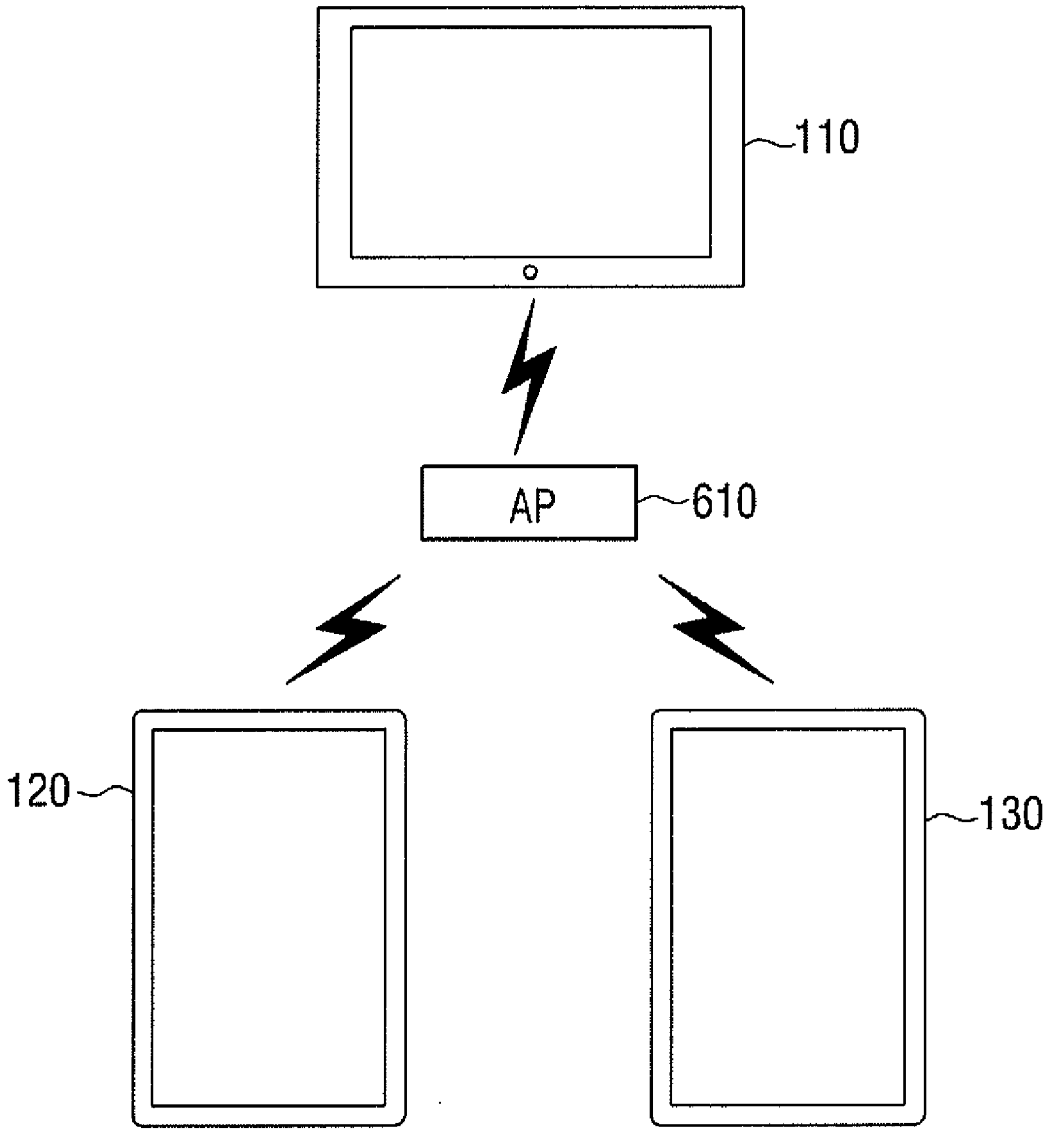
FIG. 6 is a block diagram illustrating a controlling system, according to yet another exemplary embodiment.

In another exemplary embodiment of a controlling system illustrated in the block diagram in FIG. 6, the TV 110, the first touch pad 120, and the second touch pad 130 are connected with each other wirelessly, and the controlling authority is provided and retrieved via an access point (AP) 610 which operates as a hub. Alternatively, parts of the devices may be connected by wire and the other parts may be connected wirelessly.

Figure 7:
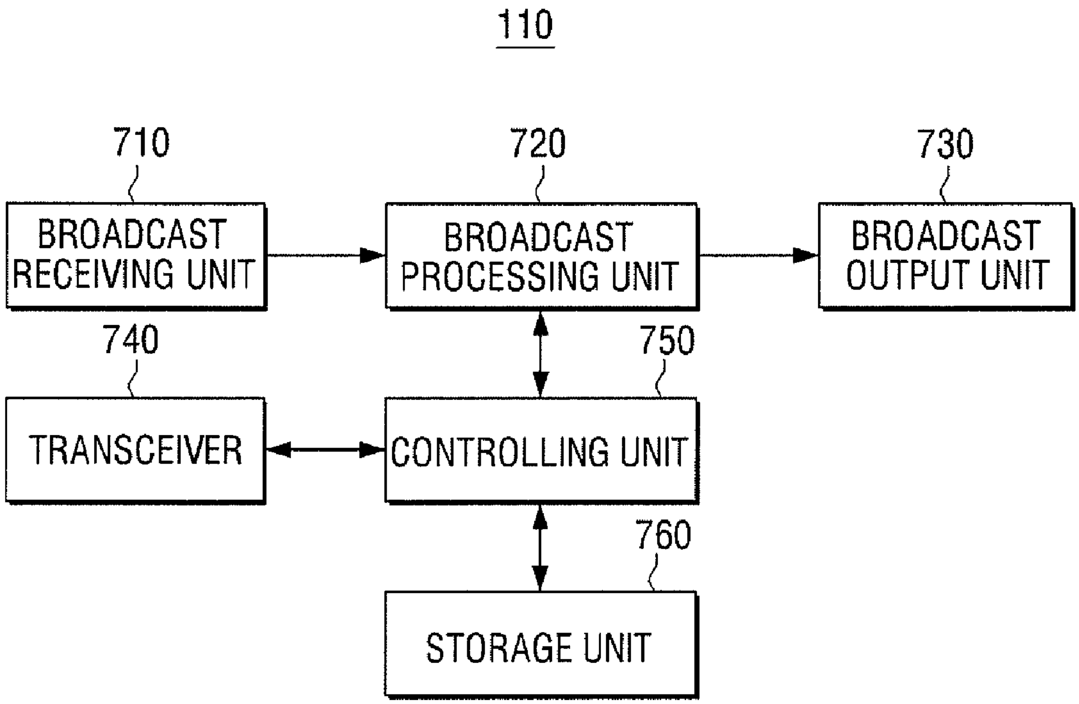
FIG. 7 is a block diagram illustrating units of a television (TV), according to an exemplary embodiment.

FIG. 7 is a block diagram illustrating various units of the TV 110, according to an exemplary embodiment. FIG. 7 schematically depicts only the units necessary to explain an exemplary embodiment.

Referring to FIG. 7, the TV 110 comprises a broadcast receiving unit 710, a broadcast processing unit 720, a broadcast output unit 730, a transceiver 740, a controlling unit 750, and a storage unit 760.

The broadcast receiving unit 710 tunes to receive a broadcast wirelessly through the air or wired through a cable, and demodulates the tuned broadcast.

The broadcast processing unit 720 processes a broadcasting signal output from the broadcast receiving unit 710. Specifically, the broadcast processing unit 720 separates the broadcast signal output from the broadcast receiving unit 710 into an audio signal and a video signal, decodes the audio signal, and converts the decoded audio signal to be output via a speaker provided on the TV 110. The broadcast processing unit 720 decodes the video signal and converts the decoded video signal to be output through a display (not shown) on the TV 110.

The broadcast output unit 730 outputs video and audio corresponding to the video signal and the audio signal being output from the broadcast processing unit 720, and thus provides a user with the video and audio.

The transceiver 740 receives a controlling command from a controlling device such as the first touch pad 120 and the second touch pad 130, and transceives a message or information regarding the request for providing or retrieving controlling authority by communicating with the controlling device.

The controlling unit 750 controls the TV 110 according to the controlling command received from the transceiver 740, and controls overall operations of the TV 110 according to the request for retrieving the controlling authority received from the transceiver 740, so that the controlling authority may be retrieved from the other devices.

The storage unit 760 stores information regarding broadcasting programs received from the broadcast receiving unit 710, information to control the TV 110, and programs to execute overall operation of the TV 110. In particular, the storage unit 760 stores information regarding which controlling device currently has the controlling authority, and updates the information when the ownership of the controlling authority is changed later. The storage unit 760 may be implemented using a hard disk drive, a non-volatile memory, and so on.

Figure 8:
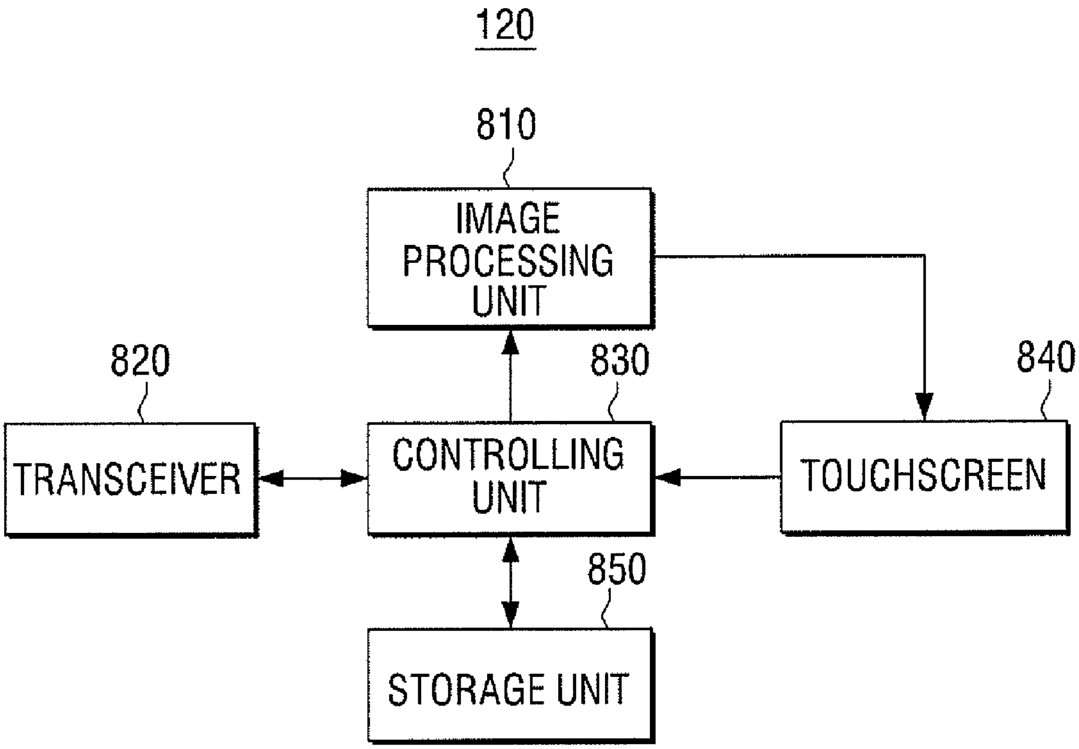
FIG. 8 is a block diagram illustrating units of a first touch pad, according to an exemplary embodiment of the present invention.

FIG. 8 is a block diagram illustrating units of the first touch pad 120 according, to an exemplary embodiment. FIG. 8 schematically depicts only the units necessary to explain an exemplary embodiment. The first touch pad 120 comprises an image processing unit 810, a transceiver 820, a controlling unit 830, a touchscreen 840, and a storage unit 850.

The image processing unit 810 displays information on the touch screen 840 regarding controlled devices which are capable of being controlled by the first touch pad 120, which will be described later using a graphical user interface (GUI).

The transceiver 820, in this exemplary embodiment, communicates with controlled devices such as the TV 110, transceives a message or information regarding the request for providing or retrieving controlling authority, and transmits a controlling command to the controlled device according to a user's manipulation, once the controlling authority is retrieved.

The controlling unit 830 controls overall operations of the first touch pad 120 according to the user's input received from the touchscreen 840.

The touchscreen 840 displays information regarding the controlled devices which are capable of being controlled by the first touch pad 120. The touchscreen 840 also transmits a command to the controlling unit 830 when the user touches the displayed information.

The storage unit 850 stores information to control the controlled device and stores programs to execute overall operations of the first touch pad 120. The storage unit 850 may be implemented using a hard disk drive, a non-volatile memory, and so on.

The first touch pad 120 and the second touch pad 130 are described as a controlling device in this exemplary embodiment, but devices other than the first touch pad 120 and second touch 130 may also be used to control a controlled device. That is, it is not necessary for a controlling device to incorporate a touchscreen, nor is it necessary for two or more controlling devices to be devices of the same kind. For example, even if a first controlling device is a cellular phone, and a second controlling device is a remote controller controlling the TV 110, the technical aspects of the aforementioned exemplary embodiments may also be applied.

The TV 110, the STB 140, and the PC 150 are described as controlled devices in the above exemplary embodiments, but the controlled devices may also be replaced by other devices.

The notifications of the request for retrieving the controlling authority and the change of the ownership of the controlling authority are broadcast to the controlling devices in the above exemplary embodiments, but in an alternative embodiment, the notification of the request for retrieving the controlling authority may be transmitted to the second touch pad 130, and the notification of the change of the controlling authority may be transmitted to the first touch pad 120.

Also, in the exemplary embodiments described above, the first touch pad 120 requests the TV 110 to provide the controlling authority, and the TV 110 retrieves the controlling authority form the second touch pad 130. However, the technical aspects of these exemplary embodiments may also be applied when the first touch pad 120 directly requests the second touch pad 130 to provide the controlling authority, and when the first touch pad 120 directly retrieves the controlling authority from the second touch pad 130.

The first touch pad 120 may directly request the second touch pad 130 to transfer the controlling authority when the first touch pad 120 already knows which device currently has the controlling authority. In this exemplary embodiment, information regarding which device has the controlling authority, that is, information regarding the state of the ownership of the controlling authority, may be stored in the TV 110.

By storing the information regarding the state of the ownership of the controlling authority in the TV 110, the controlling authority provided to other devices may be retrieved more easily and intuitively.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations that will be apparent to those skilled in the art.

What is claimed is:

1. A system for controlling a device, comprising:

a controlled device;

a first controlling device which has controlling authority for controlling the controlled device; and a second controlling device which requests the controlled device to provide the controlling authority for the controlled device to the second controlling device, and which receives the controlling authority for the controlled device from the controlled device, wherein the controlled device transmits a message indicating that the controlling authority has been requested to the first controlling device.

2. The system for controlling a device according to claim 1, wherein the controlled device determines whether to provide the controlling authority to the second controlling device.

3. The system for controlling a device according to claim 1, wherein the controlled device sends a request to the first controlling device to retrieve the controlling authority, and if the first controlling device does not respond to the request for retrieving the controlling authority, the controlled device provides the controlling authority to the second controlling device.

4. The system for controlling a device according to claim 1, wherein if the controlling authority is provided to the second controlling device, the controlled device transmits a message indicating that the controlling authority has been provided to the second controlling device to at least one of the first controlling device and the second controlling device.

5. The system for controlling a device according to claim 1, wherein if the first controlling device does not approve the request, the first controlling device transmits a message indicating disapproval of the request to provide the controlling authority to at least one of the controlled device and the second controlling device.

6. The system for controlling a device according to claim 1, wherein the controlled device stores information regarding a state of ownership of the controlling authority for the controlled device.

7. The system for controlling a device according to claim 1, wherein if the second controlling device possesses information that an owner of the controlling authority for the controlled device is the first controlling device, the second controlling device requests the first controlling device to provide the controlling authority.

8. The system for controlling a device according to claim 1, wherein the first controlling device or the second controlling device displays a list of devices on a screen which are capable of being controlled by the first controlling device or the second controlling device, respectively, and wherein the first controlling device or second controlling device selects the controlled device from the list, and requests the selected controlled device to provide the controlling authority.

9. The system for controlling a device according to claim 1, wherein if the controlling authority is provided to the second controlling device, the first controlling device is deprived of the controlling authority.

* * * * *